United States Patent [19]

Harmsen

[11] 3,998,682
[45] Dec. 21, 1976

[54] METHOD AND DEVICE FOR WELDING POLYOLEFINIC OBJECTS

[75] Inventor: Gerhard Harmsen, Hardenberg, Netherlands

[73] Assignee: Wavin B.V., Zwolle, Netherlands

[22] Filed: Nov. 22, 1974

[21] Appl. No.: 526,417

[30] Foreign Application Priority Data

Nov. 27, 1973   Netherlands ............... 7316221

[52] U.S. Cl. .................. 156/158; 156/304; 156/306; 156/322; 156/503
[51] Int. Cl.² ...................... B29C 27/06
[58] Field of Search .......... 156/157, 158, 159, 304, 156/306, 499, 322, 309, 502, 503, 32 X; 428/57, 58, 212, 500

[56] References Cited
UNITED STATES PATENTS 2,815,308   12/1957   Robinson et al. ............... 428/212

*Primary Examiner*—William A. Powell
*Assistant Examiner*—Michael W. Ball
*Attorney, Agent, or Firm*—Ostrolenk Faber Gerb & Soffen

[57] ABSTRACT

A method and apparatus for butt welding two surfaces of different polyethylenes by heating the two surfaces up to different temperatures at which the viscosities of the two different polyethylenes of the two surfaces are equal. The heating device for heating the polyethylene surfaces comprises two separate plates which can be heated up to different temperatures. The device is also provided with pressure regulating means for controlling the pressure at which the two surfaces are pressed onto each other.

8 Claims, 5 Drawing Figures

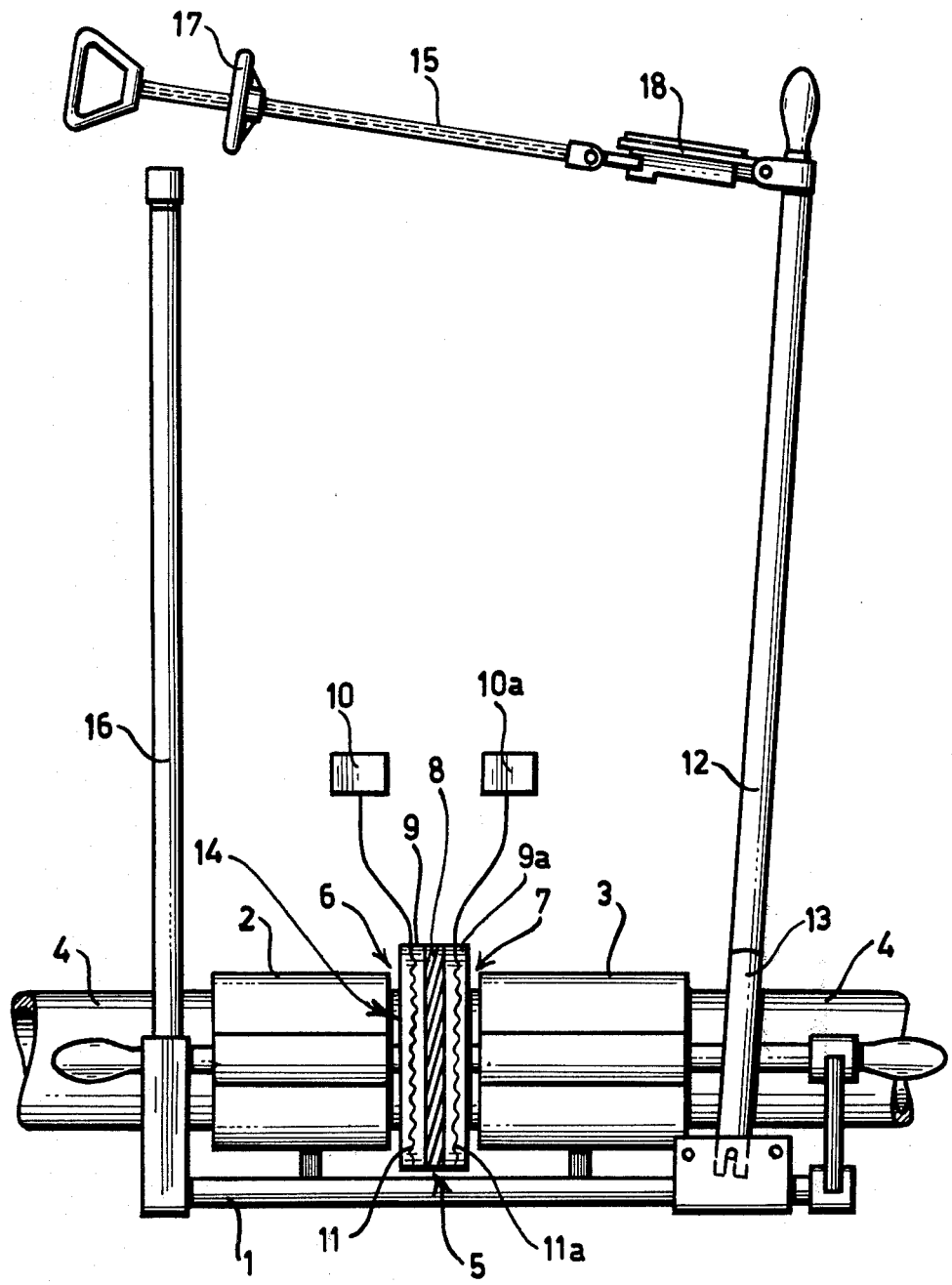

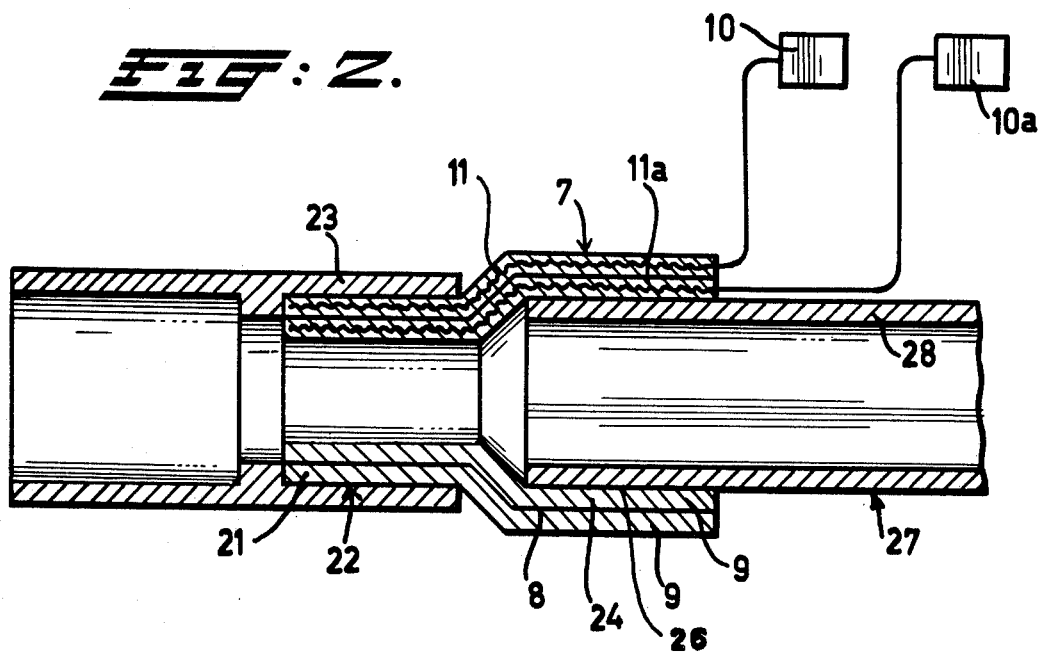
FIG: 2.
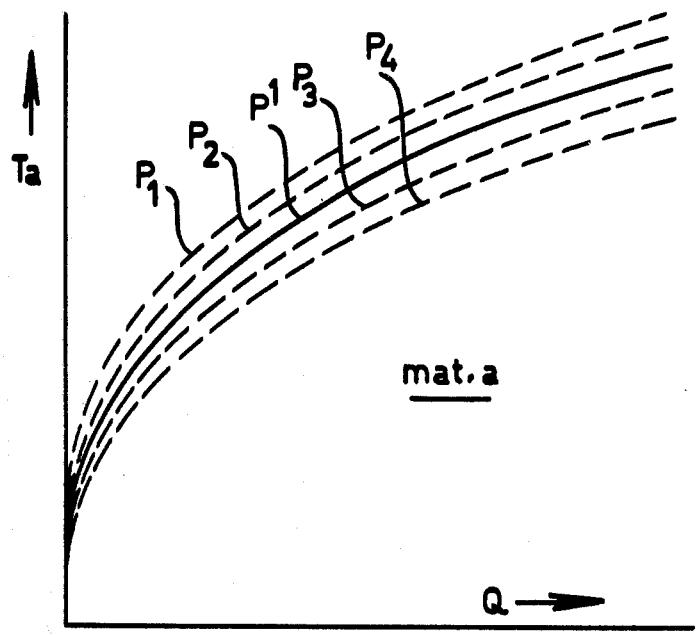
FIG: 3.

METHOD AND DEVICE FOR WELDING POLYOLEFINIC OBJECTS

BACKGROUND OF THE INVENTION

The invention relates to a method for welding polyolefinic surfaces in the presence of heat, while exerting pressure, whereby the polyolefinic surfaces are heated to their melting temperature.

Such a method is commonly known. According to this method polyolefinic surfaces to be connected of objects of the same polyolefinic material, particular pipes, are heated to above their melting point, whereupon the heated ends are pressed against each other a welded joint, thus being formed.

This known method presents the disadvantage that the formed joint does not suffice when object surfaces consisting of polyolefins with a different melt-flow-index should be welded. For melting the polyolefinic surfaces to be interconnected, a heating element with a uniform temperature is used so far, to be utilized for heating both surfaces, so that when surfaces of polyolefins with a different melt-flow-index are to be welded the two surfaces have a wholly different flow behaviour.

Polyolefins with different properties can be defined by their melt-flow-index, which is determined by measuring the quantity of liquid polymer put in grams, which per 10 minutes flows through a mouth piece of particular dimensions under a particular pressure and at a particular temperature. When the pressure is increased the velocity increases but there is no rectilinear connection between the quantity of flown out polymer per 10 minutes and the pressure.

In view of the complex connection between temperature, viscosity, melt-flow-index and pressure it is impossible to obtain a proper joint when performing the known methods when surfaces of polyolefinic objects with a different melt-flow-index should be welded.

SUMMARY OF THE INVENTION:

The invention aims to provide a method of the aforementioned type according to which a welded joint of an excellent quality can be obtained without difficulty.

This is achieved by selecting the conditions for the welding process of the surfaces of polyolefinic objects with a different melt-flow-index such that the flow behaviour of the molten mass of one polyolefin is almost equal to the flow behaviour of the molten mass of the other, when the surfaces are being welded.

When performing such a method a perfect merging of the surfaces of the two different polyolefins is obtained while a sealed joint is formed which satisfies the conditions in spite of the fact that polyolefins with different properties are used.

Such a method lends itself very well for butt welding pipes made of polyolefins, while using one pipe with a very high melt-flow-index and one pipe with a lower or even very low melt-flow-index.

Among the polyolefins polyethylene and polypropylene require particular mention; hereinafter, however, polyethylene pipes, in particular are mentioned, but this does not involve any restriction as to the material to be used.

By flow behaviour is understood in the foregoing the quantity of polyolefins, which flows off in a particular time and under a particular load, when the surface to be welded is kept in contact with a heated surface having a special temperature.

The flow behaviour of a polyolefinic pipe can be determined as follows. A polyolefinic pipe in the shape of a polyethylene pipe with a particular wall thickness and diameter and almost the same weight is disposed by its face on a heated plate. Due to the heat the parts of the polyethylene pipe which are in contact with the plate will melt, whereupon this molten part under the influence of the weight of the pipe, while eventually applying an additional load thereto, can be pressed away. This quantity of pressed away material can be calculated by determining the extent to which the synthetic pipe gives way, and the inside — and outside diameter of the pipe.

FIGS. 3 and 4 show a graph representing the connection between the quantity Q of pressed away material at a particular pressure and in a particular time in dependence of the temperature of the plate on which the polyethylene pipe is pressing. In FIG. 3 such a connection is represented for a particular material $a$ and in FIG. 4 for a particular material $b$. The quantity Q is the amount of polyethylene material pressed away at a charge of 10,5 kg when the polyethylene tube rests upon a plate having the temperature T. In the graphs P represents the pressure at which flow occurs.

The data mentiond in FIG. 3 and 4 can finally be plotted in a graph according to FIG. 5, in which the connection is represented between the temperature of the material B and the temperature of the material A, the same quantity of molten material being pressed away. The curve represented in FIG. 5 is at its lower end delimited by the melting temperature of the polyolefins and at its upper end by the decomposition temperature. It is obvious that a particular point on the curve indicates a temperature Tb for the second material and a temperature $T_a$ for the first material, at which the materials have equal viscosities resulting in an excellent welded joint.

For the sake of completeness it should be noted that in FIGS. 3 and 4 some curves are shown in dotted lines exhibiting that the load applied to the synthetic pipe varied during the determination of the flow behaviour. At pressures lower than P', that is to say the pressures P4 and P3, less material will melt away, whereas at pressures higher than P' that is to say the pressures P1 and P2 more material will melt away.

The graph according to FIG. 5 is therefore a graph which refers to a particular load of the synthetic pipe during the period of contact with the heated plate and when the synthetic material in the shape of polyethylene is melting away.

After the determination of a graph as represented in FIG. 5 it is very simple to select the suitable temperatures to which the surfaces of the two different polyolefins should be heated, in order to obtain a proper welded joint.

In the accompanying table A the connection is represented between the temperatures and the quantity of pressed away material for two different polyethylenes, one polyethylene having a melt-flow-index of 0.3 at a load of 5 kg and a temperature of 190° C and the other polyethylene having a melt-flow-index of 1,1 at a load of 5 kg and a temperature of 190° C the two, melt-flow-indexes being determined according to the DIN-method.

Each of the surfaces to be interconnected is advantageously heated for an equal time at first under a compressive load at a particular temperature and thereupon for a second time after this load has been cancelled.

Such an embodiment presents the advantage that a rather considerable quantity of molten material is obtained, which can be used for the formation of the welded joint.

The surfaces to be welded are efficiently heated 40° to 150° C above their melting temperature and in case of butt welding, the pipe surfaces are preferably heated to a temperature ranging from 50° to 90° C above their melting point. In practice it has been found that it is advisable to heat the surface of a first polyolefinic pipe with the highest melt-flow-index to a temperature which is 30° to 50° C lower than that of the surface of a second polyolefinic pipe with a lower melt-flow-index to be connected with the first pipe.

The invention relates likewise to a device for performing the method according to the invention, comprising centering members for retaining and centering two polyolefinic parts which should be interconnected, which centering means are relatively movable with respect to each other and a heating member for heating the polyolefinic surfaces to be interconnected the device being distinguished in that it comprises two heating members which can be individually controlled.

In this manner the surfaces of one of the polyolefinic objects can be heated up to quite another temperature than the temperature of the surface of the object consisting of a wholly different polyolefin.

For example one may take in mind temperatures of 200° C and 220° C, respectively, in case of a polyethylene with a high melt-flow index and a polyethylene with a low melt-flow-index respectively.

In general when polyethylene pipes with a high and a low-melt-flow index are buttwelded a difference of temperature between the surfaces of 30° to 40° C will be selected. This may e.g. be achieved by heating one surface to a temperature of 215° C and the other surface to a temperature of 180° C.

It is advisable to keep each of the surfaces above a temperature of at least 160° C and preferably above 170° C when the polyethylene surfaces are being welded.

The two individually controllable heating members are effectively united so as to form an entirety, while an insulating layer is applied between them.

It is particularly advisable to provide the two heating members with proportionally controllable heating elements for adjusting the desired temperature.

The heating members are constructed advantageously of aluminium with cast-in heating elements.

For uniting two pipe ends by butt welding two flat heating plates are used, but on uniting the inside of a widened female pipe end with a male pipe end, sleeve-shaped heating elements are used.

For uniting a pipe with a saddle member devices adapted to such a process can be used.

Each heating member is advantageously provided with a temperature feeler.

SURVEY OF THE DRAWINGS:

FIG. 1 shows a device according to the invention, which can be used for buttwelding pipe ends of different polyolefins;

FIG. 2 is another device for welding a polyolefinic male and female pipe part.

Figure 4:
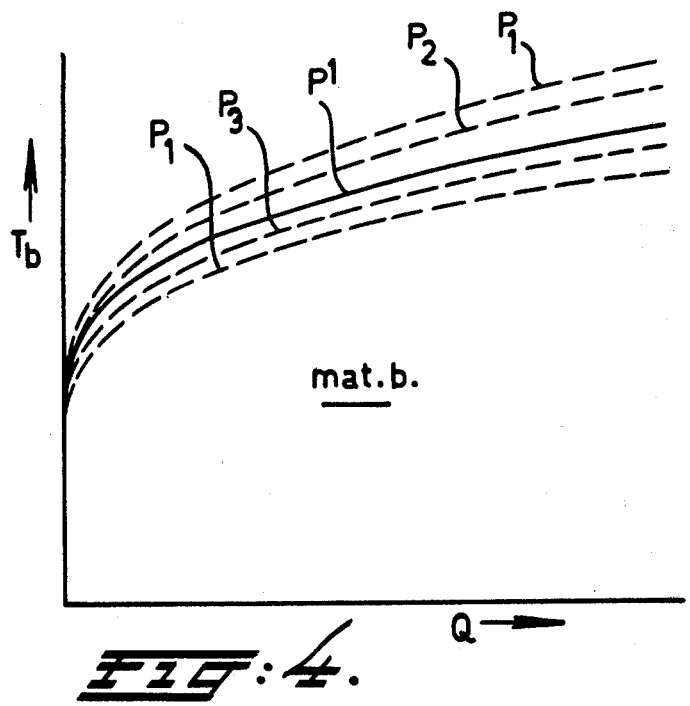
Figure 5:
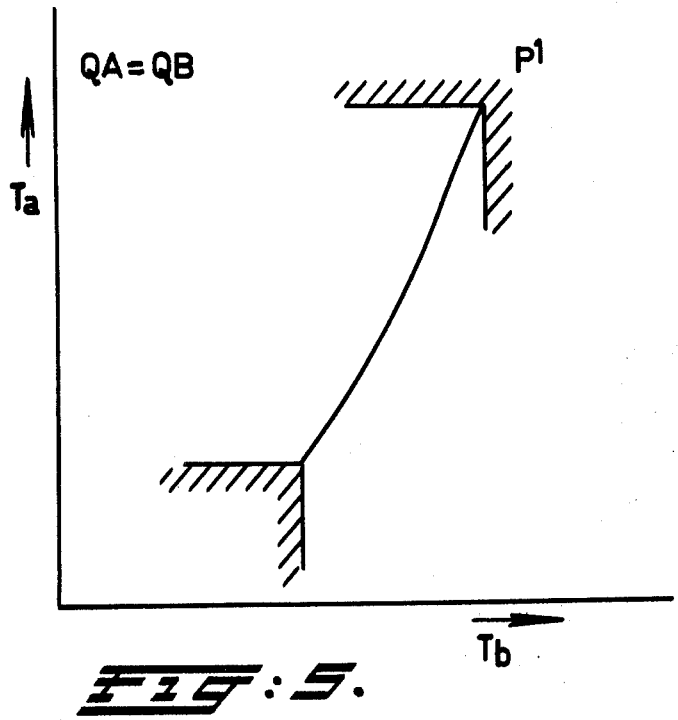

FIGS. 3 and 4 plot the quantity of material that may be removed from a respective pipe at a particular temperature and pressure level; and FIG. 5 is a plot of the temperatures and pressures at which a predetermined quantity of material from both pipes becomes removable.

DESCRIPTION OF PREFERRED EMBODIMENT :

FIG. 1 shows a device comprising a part 1 with vice clamps 2 and 3 in which the pipes 4 to be welded, e.g. polyethylene pipes or polypropylene pipes, can be clampingly aligned. The two vice clamps 2 and 3 or only one of them can be slid to and fro.

The device is further provided with a welding set 5 which can be placed between the vice clamps 2 and 3. This welding set comprises two welding mirrors 6 and 7 which are separated by an insulating layer 8. The two welding mirrors 6 and 7 are provided with internal heating wires, while each welding mirror 6, 7 consists of aluminium. Each welding mirror 6, 7 is furthermore provided with a temperature sensor 9 cooperating with the feeders 10, 10a of the heating wires 11, 11a.

For cleaning the ends of the pipes 4 plates with scraping knives can be provided. These knives are, however, not shown in the present case. The welding mirrors 6, 7 are for instance heated by means of heating wires up to two different temperatures which can be determined by means of the table A.

For example the material a is pressed for 1 minute against a plate of 210° C under a total load of 10.5 kg. After 1 minute this load is cancelled and then the total load still amounts to 0.5 kg, the latter load also being applied for 1 minute, while heating is continued. The flow behaviour coefficient is 1.58 in that case.

In order to obtain the same flow behaviour for the material b mentioned in the table A, one should select a temperature under 200° C.

After 2 minutes the welding mirror is removed while the ends of the pipes to be interconnected are pressed against each other, and a total load is applied of e.g. 8 kg.

In order to prevent the polyethylene surfaces from adhering to the welding mirrors the latter may be covered with a teflon layer 14.

As stated hereinbefore the welding mirrors are removed after the surfaces to be united have been maintained at a particular temperature for the same time, whereupon the pipe ends of the polyolefinic pipes are pressed against each other; a pressure of a particular strength should be exerted for the latter operation which may be in the range from 0.7 to 0.9 kg/cm². For exerting this pressure the device is provided with a loose lever 12 for shifting the vice clamp 2 by means of a fork 13 which is placed over the pipe 4 on the pivotal points. Furthermore a pull rod 15 with screw thread is provided which is locked at the upper end of a stand. An adjusting wheel 17 serves to regulate the force exerted on the lever via the pull rod. A meter 18 is provided as well, on which the force adjusted by means of the adjusting wheel 17 can be read off.

It is obvious that the lever 12 can also be used in the process of melting a sufficient quantity of material, when the ends of the pipes are pressed against the welding mirrors. After a lapse of time the load can be reduced or entirely cancelled while the heating of the end is continued whereby a larger quantity of molten polyolefinic material is produced.

For uniting a male pipe end with a female pipe end a device as shown in FIG. 2 can be used. This device comprises a heatable cylinder 21 which can cooperate with the inside 22 of a socket 23, whereas a second heating member 24 is provided, the inner cylindrical surface 26 of which can cooperate with the outer surface 27 of the male pipe part 28. After sufficiently melting the surfaces and heating them up to the desired temperature, the heating member is removed and by means of the supporting members shown in FIG. 1, the male pipe part is slid into the female pipe part while exerting a particular pressure.

In this case too, the materials a and b mentioned in the table A are used, which are united by welding. For the material a a temperature of 215° C is selected and for the material b of 180° C.

The pressure exerted while welding the pipes ranges from 0.7 to 0.9 kg/cm$^2$.

ment so as to cause the materials of the surfaces to weld.

2. A method according to claim 1, wherein each of the surfaces is at first heated under a compressive load for an equal time and thereupon for a second time after this compressive load has been cancelled.

3. A method according to claim 1, wherein the surfaces are heated to temperatures ranging from 49° to 150° C above their melting temperatures of their respective materials.

4. A method according to claim 1, wherein about equal masses of each surface are melted.

5. A method according to claim 1, comprising the further step of applying a pressure load to the surfaces while they are being heated.

6. A method according to claim 1, wherein
   the heating of the second surface is to a temperature that is a first amount above the melting point of the

TABLE A

| | MATERIAL a | | | | | MATERIAL b | | | | |
|---|---|---|---|---|---|---|---|---|---|---|
| Temperature of plate | Time lapsed before melting in sec. | Pressed away material in cm3 after 60 sec. | Continued heating time calculated from the beginning by heating at a pressure of 0.5 kg at which additional material is pressed away after replacing a load of 10.5 kg by a load of 0.5 kg after 1 min. heating under a load of P-total 10.5 kg/cm2 | Pressed away additional material in cm3 after 90 sec. continued heating** | Flow behaviour | Lapse of time after which melting occurs* | Pressed away material in cm3 after 60 sec.* | Continued heating time calculated from the beginning by heating at a pressure of 0.5 kg at which additional material is pressed away, after replacing a load of 0.5kg after 1 min. heating under a load of P-total=10.5 kg | Pressed away material in cm3 after 90 sec. of continued heating | Flow behaviour |
| 170 | 48 | 0.04 | 160 | — | 0.04 | 37 | 0.27 | 95 | — | 0.27 |
| 180 | 29 | 0.27 | 105 | — | 0.27 | 26 | 0.66 | 65 | 0.09 | 0.75 |
| 190 | 28 | 0.51 | 86 | 0.02 | 0.53 | 25 | 0.98 | 53 | 0.22 | 1.20 |
| 200 | 26 | 0.64 | 68 | 0.07 | 0.71 | 24 | 1.21 | 40 | 0.37 | 1.58 |
| 210 | 22 | 0.86 | 70 | 0.08 | 0.94 | 13 | 1.64 | 28 | 0.57 | 2.21 |
| 220 | 12 | 1.28 | 45 | 0.30 | 1.58 | 12 | 2.15 | 23 | 0.80 | 2.95 |
| 230 | 13 | 1.55 | 35 | 0.42 | 1.97 | 15 | 2.29 | 12 | 0.95 | 3.24 |

*Ptotal = 10.5 kg.
**Ptotal = 0.5 kg which is applied after 1 minute heating at a pressure of 10.5 kg which constitutes the beginning of the continued heating time.

What I claim is:

1. A method of welding two polyolefinic surfaces, each comprised of a material having a respective melt-flow index, the material of the first surface having a higher melt-flow index than the material of the second surface and the materials of both surfaces having different melting points; said method comprising the steps of:
   heating the first surface to a predetermined temperature and for such time that the material of the first surface has a predetermined flow behavior characteristic;
   heating the second surface to a predetermined temperature and for such time that the material of the second surface has a flow behavior characteristic substantially equal to the predetermined flow behavior characteristic;
   moving the heated surfaces when they are at substantially equal flow behavior characteristics into abutment material of the second surface; the heating of the first surface is to a temperature that is less than the first amount above the melting point of the material of the first surface.

7. A method according to claim 1, wherein the first and the second surfaces are respectively at the butt ends of a first and a second pipe, respectively;
   the heating of both of the first and second surfaces is to respective temperatures in the range of from 50° C. to 90° C. above their respective melting points.

8. A method according to claim 1, wherein the first and second surfaces are respectively on a first and a second pipe and wherein the material of the first surface has a higher melt-flow index than the material of the second surface; the first surface is heated to a temperature in the range of 30° C. to 50° C. less than the temperature to which the second surface is heated.

* * * * *